US012385588B2

(12) United States Patent
Staples et al.

(10) Patent No.: US 12,385,588 B2
(45) Date of Patent: Aug. 12, 2025

(54) SIDE ENTRY SUB

(71) Applicant: M&M International LLC, Cade, LA (US)

(72) Inventors: Tripp Capel Staples, Youngsville, LA (US); Shaun Paul Montet, Youngsville, LA (US); Juan Carlos Hincapie, Broussard, LA (US); Johnson M. McKnight, Youngsville, LA (US)

(73) Assignee: M&M INTERNATIONAL, LLC, Cade, LA (US)

( * ) Notice: Subject to any disclaimer, the term of this patent is extended or adjusted under 35 U.S.C. 154(b) by 0 days.

(21) Appl. No.: 18/036,563

(22) PCT Filed: Nov. 24, 2021

(86) PCT No.: PCT/US2021/060688
§ 371 (c)(1),
(2) Date: May 11, 2023

(87) PCT Pub. No.: WO2022/115509
PCT Pub. Date: Jun. 2, 2022

(65) Prior Publication Data
US 2024/0011590 A1    Jan. 11, 2024

Related U.S. Application Data

(60) Provisional application No. 63/118,839, filed on Nov. 27, 2020.

(51) Int. Cl.
F16L 41/14    (2006.01)
E21B 17/042   (2006.01)
(52) U.S. Cl.
CPC ........... F16L 41/14 (2013.01); E21B 17/0426 (2013.01)

(58) Field of Classification Search
CPC ......... F16L 41/04; F16L 41/045; F16L 41/06; F16L 41/065; F16L 41/086; F16L 41/14
See application file for complete search history.

(56) References Cited

U.S. PATENT DOCUMENTS 2,713,909 A    7/1955   Baker
3,545,542 A *  12/1970  Scott ........................ F16L 41/04
                                                          166/155
(Continued)

FOREIGN PATENT DOCUMENTS

DE    19737353 A1 *  3/1999   .............. F16L 41/04
DE    19846088 A1 *  4/2000   .............. F16L 41/06
(Continued)

OTHER PUBLICATIONS

Commissioner for Patents, USPTO, as International Search Authority, International Search Report and Written Opinion for PCT/US2021/060688; Jul. 8, 2022; all pages; USPTO; Alexandria, Virginia, US.

Primary Examiner — Matthew Troutman
Assistant Examiner — Fannie Kee
(74) Attorney, Agent, or Firm — LAW OFFICE OF JESSE D. LAMBERT, LLC

(57) ABSTRACT

A side entry sub has an elongated main body with a longitudinal bore and a side passage intersecting the longitudinal bore. A removable hub has a nose portion which threadably engages mating threads in the side passage, with a resilient seal on the nose portion providing a fluid seal with the main body. The threads are formed such that a flange on the hub advances into contact with the main body with a desired contact force as holes in the flange come into alignment with threaded holes in the main body. Threaded flange bolts through the flange holes engage the threaded holes in the main body. Locking washers are used on the flange bolts. The removable hub is structurally connected to (Continued)

the main body by the threaded connection and contact of the flange with the main body, and pressure and fluid-sealed by the resilient seal.

13 Claims, 3 Drawing Sheets

(56) References Cited

U.S. PATENT DOCUMENTS

| | | | | | |
|---|---|---|---|---|---|
| 3,931,992 | A | * | 1/1976 | Coel | F16L 41/04 |
| | | | | | 285/271 |
| 4,132,243 | A | * | 1/1979 | Kuus | F16L 41/04 |
| | | | | | 15/104.062 |
| 4,681,162 | A | | 7/1987 | Boyd | |
| 4,955,406 | A | * | 9/1990 | Antoniello | F16L 41/065 |
| | | | | | 285/198 |
| 5,054,820 | A | * | 10/1991 | Lesquir | F16L 41/04 |
| | | | | | 47/52 |
| 5,373,866 | A | * | 12/1994 | Whalen, II | F16L 41/06 |
| | | | | | 222/5 |
| 8,651,174 | B2 | * | 2/2014 | Barbee | F16L 41/04 |
| | | | | | 166/70 |
| 8,899,254 | B1 | * | 12/2014 | Weiler | F16L 41/04 |
| | | | | | 81/53.2 |
| 9,661,807 | B2 | * | 5/2017 | Turk | F16L 41/04 |
| 2004/0251018 | A1 | | 12/2004 | McLeod et al. | |
| 2007/0068679 | A1 | | 3/2007 | Robichaux et al. | |
| 2008/0271884 | A1 | | 11/2008 | Robichaux et al. | |
| 2015/0233514 | A1 | * | 8/2015 | Kesler | F16L 41/06 |
| | | | | | 285/208 |
| 2018/0259108 | A1 | * | 9/2018 | Korus | F16L 41/04 |
| 2019/0017628 | A1 | * | 1/2019 | Malasorti | F16L 41/04 |

FOREIGN PATENT DOCUMENTS

| | | | | | |
|---|---|---|---|---|---|
| DE | 102012109033 | A1 | * | 3/2014 | F16L 41/06 |
| EP | 0611912 | A1 | * | 8/1994 | F16L 41/04 |
| FI | 60921 | B | * | 12/1981 | F16L 41/04 |
| JP | 08338586 | A | * | 12/1996 | F16L 41/06 |
| JP | 10002477 | A | * | 1/1998 | F16L 41/06 |
| KR | 20140046940 | A | * | 4/2014 | F16L 41/04 |

* cited by examiner

SIDE ENTRY SUB

CROSS REFERENCE TO RELATED APPLICATIONS

This United States non-provisional patent application claims priority to U.S. provisional patent application Ser. 63/118,839, filed Nov. 27, 2020, for all purposes. The disclosure of that provisional patent application is incorporated herein by reference, to the extent not inconsistent with this application.

BACKGROUND

Field of the Invention

Various types of apparatus are used in connection with the drilling and servicing of oil and gas wells. At times, it is desired to have the ability to pump into a drillstring by a flowpath other than or in addition to the usual flowpath (directly down the drillstring bore), namely by a connection at the top of the drillstring. Such flowpath may be provided by a "side entry" sub, which is a tubular sub that comprises one or more fluid flowpaths into the bore of the drillstring through the wall of the sub, typically by a short tubular piece (which may be flanged) (which may be referred to as a "hub") onto which a hose or similar flowline can be connected, hence the fluid flowing into the "side" of the drillstring.

Prior art side entry subs present various issues, giving rise to a desire for an improved side entry sub that addresses these issues.

SUMMARY OF THE INVENTION

The side entry sub of the present invention comprises an elongated main body, typically with a larger outer diameter central portion. The main body preferably comprises threaded connections or similar means on each end for connection within a drillstring. The main body has a longitudinal bore.

A side passage, which comprises threads in a portion of its length, extends through the wall of the main body, connecting to the bore of the main body. The side entry element, which may be referred to as the "hub," has a nose portion with mating threads to make up into the threads of the passage, and has a bore to permit fluid flow into the main body longitudinal bore. While various thread types are possible, preferably a straight or parallel (rather than tapered) thread form is employed. A resilient seal element, which may be an O-ring or similar seal element, is preferably disposed on the nose portion and provides a fluid and pressure seal between the hub and the main body.

The hub additionally comprises a flange with a flange face which bears against the main body with a desired contact force, when the threaded connection between the main body and hub is fully made up. One or more, typically four, flange bolts further attach the hub flange to the main body. Preferably, the flange bolts comprise a locking means to prevent back-out of the bolts. The locking means may comprise locking washers and wired bolts. Alternatively, and in a presently preferred embodiment, the locking means comprises NORD-LOCK® locking washers, providing an extra element of security to the connection.

The outer end of the hub comprises a means for connecting a circulating hose or similar fluid line to the hub, for fluid passage through the hub into the bore of the main body. External hammer union threads are commonly used.

DESCRIPTION OF THE PRESENTLY PREFERRED EMBODIMENT(S)

While various side entry subs can embody the principles of the present invention, with reference to the drawings some of the presently preferred embodiments can be described.

Figure 1:
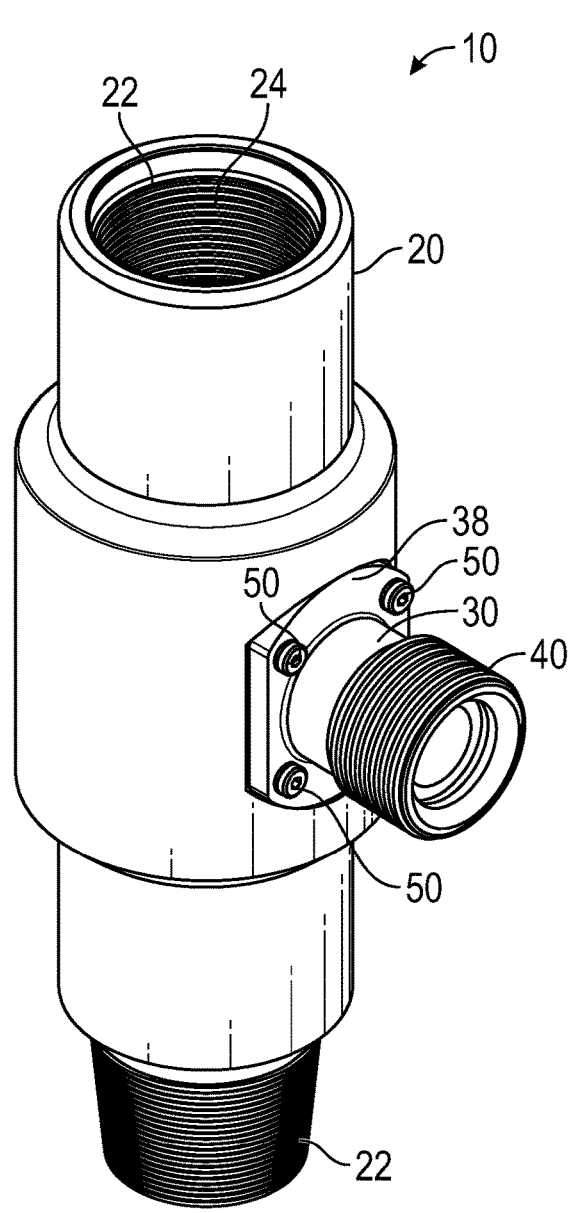
FIG. 1 is a perspective view of the side entry sub embodying the principles of the present invention.
Figure 2:
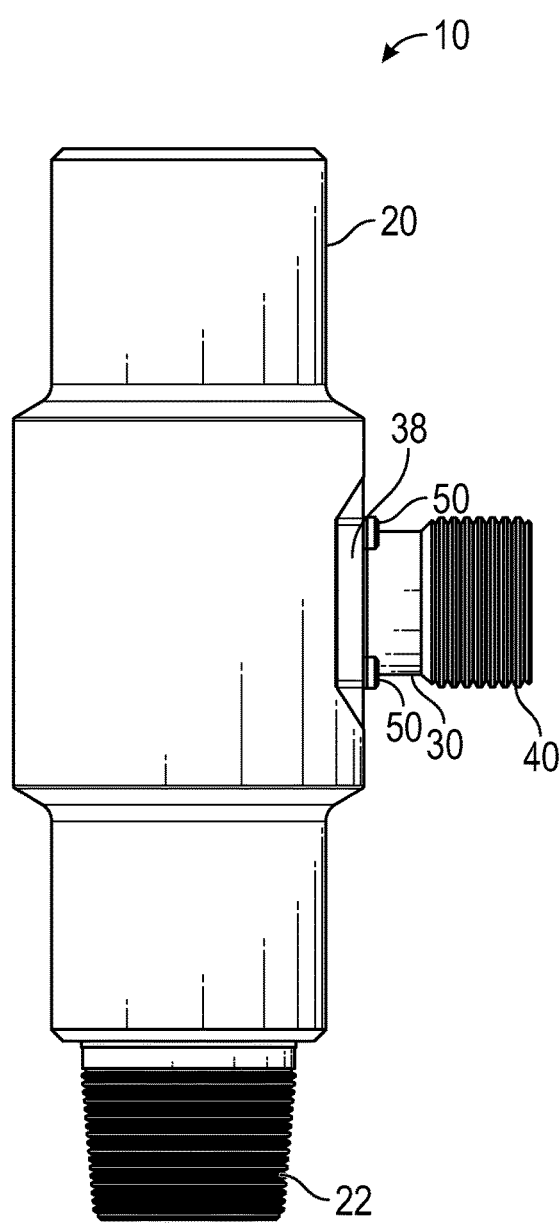
FIG. 2 is a side view of the side entry sub of FIG. 1.
Figure 3:
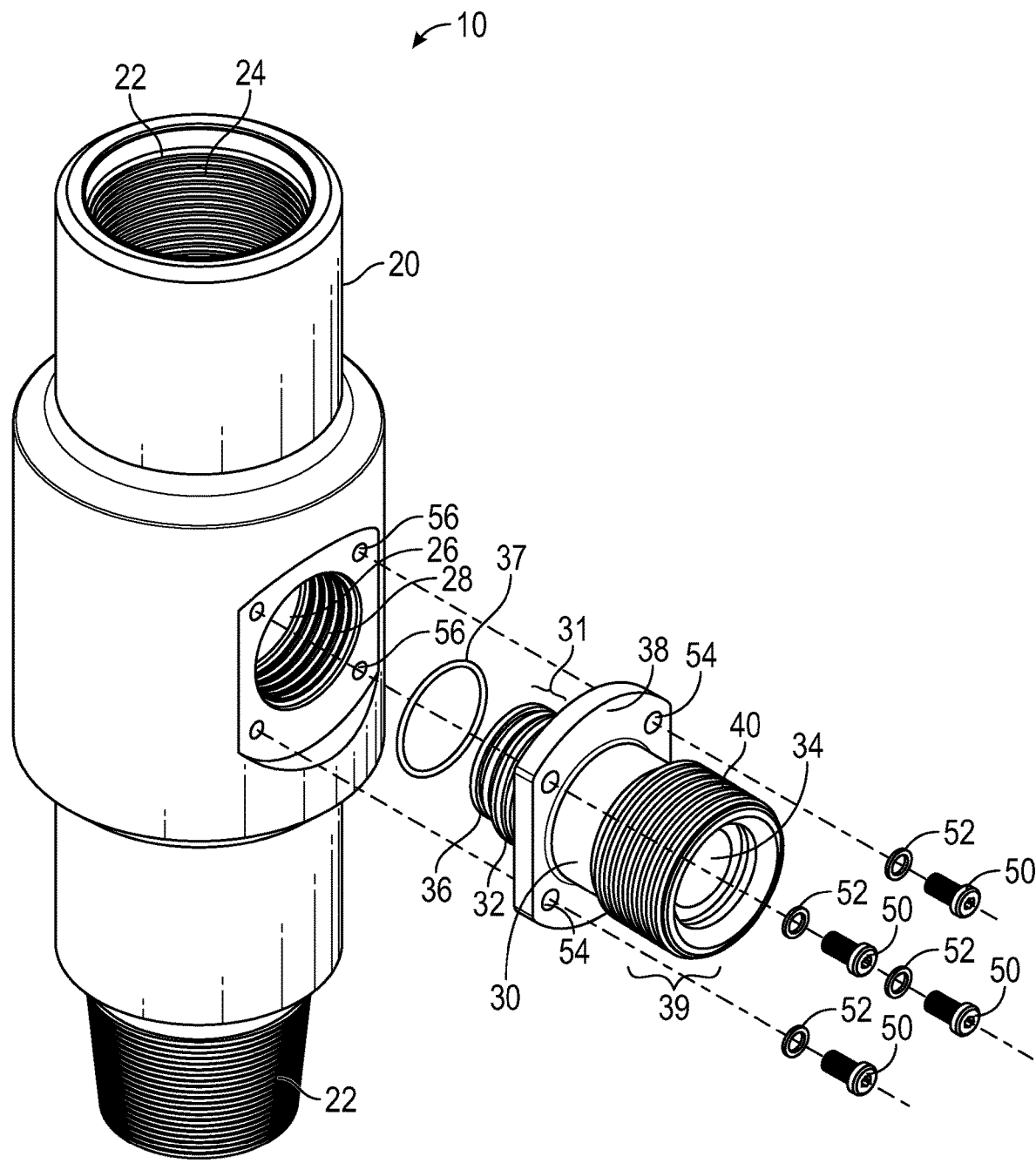
FIG. 3 is an exploded, perspective view of the side entry sub.

FIGS. 1 and 2 are perspective and side assembled views, respectively, of side entry sub 10, which may be referred to as "sub" 10, embodying the principles of the present invention. Sub 10 comprises an elongated main body 20, preferably with threaded connections 22 at either end, for makeup within a drillstring. As can be seen in FIG. 1, main body 20 comprises a longitudinal bore 24 for fluid passage through main body 20. A side passage 26, which may be better seen in FIG. 3, is positioned at a desired point along the length of main body 20 and provides a fluid flowpath through the wall of main body 20 into bore 24. Passage 26 comprises internal threads 28 over a portion of its length. A removable hub 30 connects to main body 20, as seen in FIGS. 1 and 2, and as described in more detail below.

Figure 4:
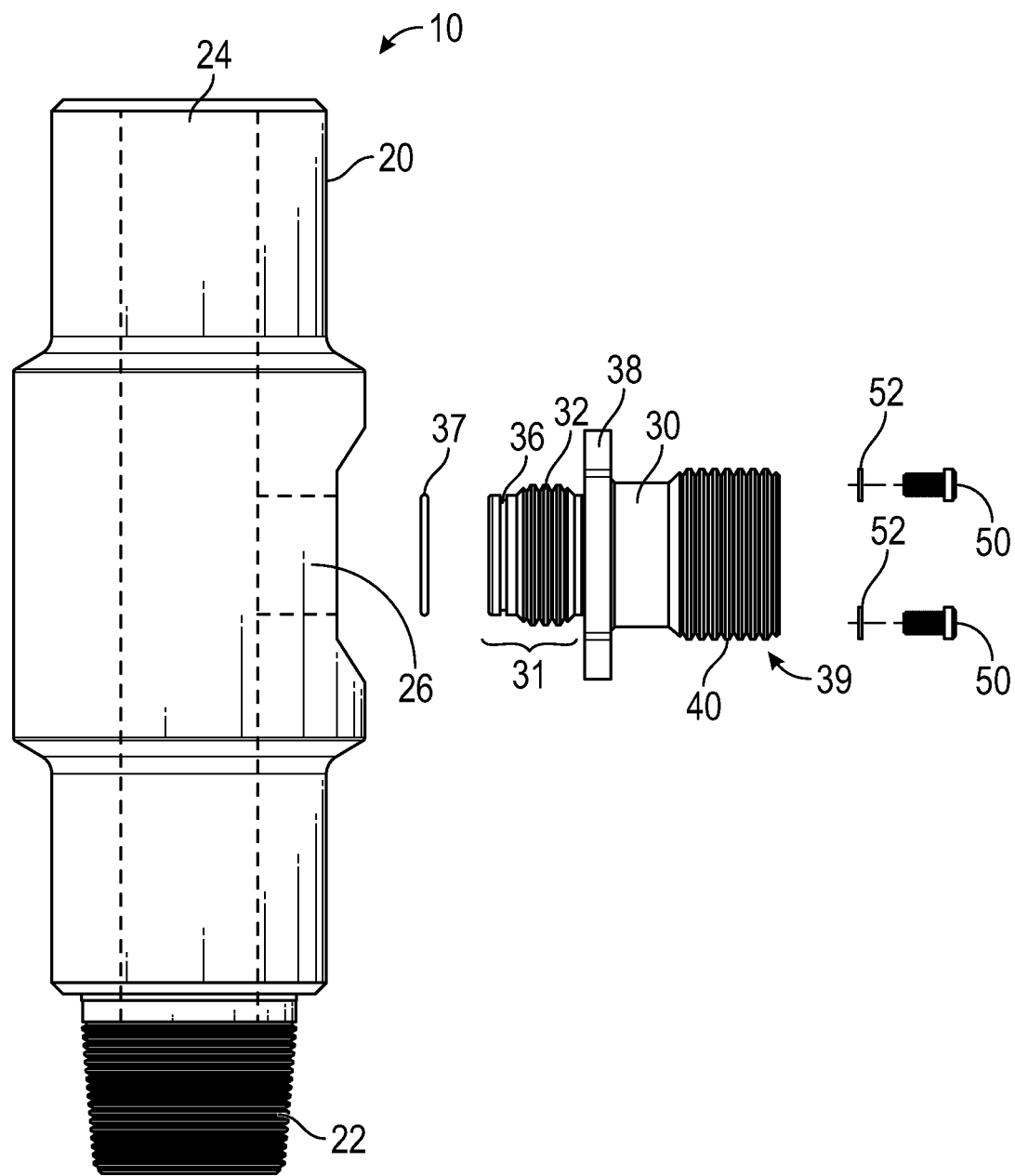
FIG. 4 is an exploded, side view of the side entry sub.

FIGS. 3 and 4 are exploded perspective and side views, respectively, of the various elements of side entry sub 10. Hub 30 comprises a nose portion 31, which comprises threads 32 to engage threads 28 in passage 26. A seal groove 36 is positioned on nose portion 31, into which a resilient seal element 37, which may be an O-ring or similar resilient seal, is placed. Hub 30 further comprises a bore 34 and a flange 38. The outermost end 39 of hub 30 preferably comprises coarse external threads 40 to enable connection of a hose or other fluid line thereto by a hammer union or similar connection means.

Sub 10 is assembled by screwing hub 30 into side passage 26. Resilient seal element 37 is first mounted in seal groove 36. Preferably, threads 28 and 32 are "straight" or parallel threads, rather than tapered threads. Suitable thread forms may include ACME or similar type threads, which generally require low torque to fully engage the threads. Hub 30 is screwed into side passage 26 until flange 38 contacts main body 20. During manufacture, the threads are cut ("timed" or "clocked") so that bolt holes 54 in flange 38 align with the threaded bolt holes 56 in main body 20, when flange 38 contacts main body 20 and suitable final torque is applied, yielding a desired contact force between flange 38 and main body 20. Upon achieving this final rotational position with hub 30, hub 30 is both pressure- and fluid-tight connected to main body 20 (by seal element 37 and threads 28 and 32), and structurally connected to main body 20 via threads 28 and 32, and contact of flange 38 with main body 20.

Flange bolts 50 can then be inserted through flange bolt holes 54 and made up into threaded holes 56 in main body 20. While four flange bolts 50 are shown, it is understood that other numbers could be used. Preferably, locking washers 52 are used on flange bolts 50, which may be NORD-LOCK® or similar type locking washers.

Sub 10 and its various components may be manufactured from high strength metal alloys as known in the art, and as needed to suit particular applications. Dimensions may be varied to meet particular applications. Methods of manufacture are known in the relevant art.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof.

Therefore, the scope of the invention is to be determined not by the illustrative examples set forth above, but by the appended claims and their legal equivalents.

We claim:

1. An apparatus, comprising:
    an elongated main body comprising a longitudinal bore therethrough, said longitudinal bore forming a wall in said main body, said main body further comprising a side passage extending through said wall and intersecting said longitudinal bore, said side passage comprising internal threads therein;
    a removable hub comprising a longitudinal bore therethrough, and further comprising:
        a nose portion comprising threads engageable with said internal threads in said side passage;
        a flange; and
        an outermost end comprising external threads;
    a resilient seal element sealing between said main body and said removable hub, when said removable hub is threadably engaged with said internal threads in said side passage of said main body; and
    wherein, when said removable hub is fully threadably engaged with said main body, said flange is in contact with said main body, and one or more fasteners are positioned through holes in said flange and into said main body, thereby preventing rotation of said removable hub.

2. The apparatus of claim 1, wherein said nose portion of said removable hub comprises a seal groove, and wherein said resilient seal element is disposed in said seal groove.

3. The apparatus of claim 2, wherein said one or more fasteners comprise threaded flange bolts extending through said holes in said flange and threadably engaging threaded holes in said main body.

4. The apparatus of claim 3, further comprising locking washers between said flange bolts and said flange.

5. The apparatus of claim 1, wherein said internal threads in said side passage and said threads of said nose portion of said removable hub comprise parallel thread forms.

6. The apparatus of claim 1, wherein said main body comprises threaded connections at either end.

7. A side entry sub, comprising:
    an elongated main body comprising a longitudinal bore therethrough, said longitudinal bore forming a wall in said main body, said main body further comprising a side passage extending through said wall and intersecting said longitudinal bore, said side passage comprising internal threads therein;
    a removable hub comprising a longitudinal bore therethrough, forming a flowpath through said removable hub and into said longitudinal bore of said main body when said removable hub is threadably engaged with said main body, wherein said removable hub further comprises a nose portion comprising threads engageable with said internal threads in said side passage and a seal groove, an outermost end comprising external threads, and a flange positioned between said nose portion and said outermost end;
    a resilient seal element positioned in said seal groove and sealing between said main body and said removable hub, when said removable hub is threadably engaged with said main body; and
    wherein, when said removable hub is fully threadably engaged with said main body, said flange is in contact with said main body, and one or more fasteners are positioned through holes in said flange and into said main body, thereby preventing rotation of said removable hub.

8. The side entry sub of claim 7, wherein said fasteners comprise threaded flange bolts extending through said holes in said flange and threadably engaging threaded holes in said main body.

9. The side entry sub of claim 8, further comprising locking washers between said flange bolts and said flange.

10. The side entry sub of claim 8, wherein said threads in said side passage and said threads on said nose portion of said removable hub are formed so that said flange contacts said main body with a desired contact force when said holes in said flange are aligned with said threaded holes in said main body.

11. The side entry sub of claim 10, wherein said internal threads in said side passage and said threads of said nose portion of said removable hub comprise parallel thread forms.

12. The side entry sub of claim 11, wherein said external threads on said outermost end of said removable hub comprise hammer union threads.

13. The side entry sub of claim 12, wherein said main body comprises threaded connections at either end.

* * * * *